United States Patent
Sugimoto et al.

(10) Patent No.: US 8,944,735 B2
(45) Date of Patent: Feb. 3, 2015

(54) SEALER, FASTENER, BOLT AND METHOD OF FABRICATING BOLT

(71) Applicants: Fuji Engineering Co., Ltd., Osaka (JP); Fujigiken Co., Ltd., Osaka (JP); West Nippon Expressway Company Limited, Osaka (JP)

(72) Inventors: Masanobu Sugimoto, Osaka (JP); Yasuo Murayama, Osaka (JP); Kenichi Yamada, Fukuoka (JP); Yasutoshi Yamada, Fukuoka (JP)

(73) Assignees: Fuji Engineering Co., Ltd., Osaka (JP); Fujigiken Co., Ltd., Osaka (JP); West Nippon Expressway Company Limited, Osaka (JP)

( * ) Notice: Subject to any disclaimer, the term of this patent is extended or adjusted under 35 U.S.C. 154(b) by 116 days.

(21) Appl. No.: 13/716,735

(22) Filed: Dec. 17, 2012

(65) Prior Publication Data

US 2014/0169911 A1    Jun. 19, 2014

(51) Int. Cl.
*F16B 35/00* (2006.01)
*C09D 5/08* (2006.01)
*C23C 4/12* (2006.01)

(52) U.S. Cl.
CPC .............. *C09D 5/086* (2013.01); *C23C 4/125* (2013.01); *F16B 35/00* (2013.01); *Y10S 411/914* (2013.01)
USPC ............................ 411/424; 411/368; 411/914

(58) Field of Classification Search
USPC .............. 411/914, 366.1, 424, 378, 368, 369
See application file for complete search history.

(56) References Cited

U.S. PATENT DOCUMENTS

| 3,914,178 | A  | * | 10/1975 | Fineran et al. ................ 508/103 |
| 7,160,630 | B2 | * | 1/2007  | Klos ............................. 428/658 |
| 2003/0053888 | A1 | * | 3/2003 | Takezawa ..................... 411/424 |
| 2010/0301600 | A1 | * | 12/2010 | Goto et al. ................... 285/333 |
| 2012/0057950 | A1 | * | 3/2012 | Horst et al. .................. 411/443 |

FOREIGN PATENT DOCUMENTS

| JP | 3-41207    | 1/1991  |
| JP | 2000-120183 | 4/2000 |
| JP | 2004-176901 | 6/2004 |
| JP | 2004-300509 | 10/2004 |

OTHER PUBLICATIONS

Chinese Office Action (OA) issued Jun. 4, 2014 in corresponding Chinese Patent Application No. 2011110393707X, together with English translation thereof.
Japanese Office Action issued Jan. 28, 2014 in corresponding Japanese Patent Application No. 2010-268557, together with English translation thereof.

* cited by examiner

*Primary Examiner* — Flemming Saether
(74) *Attorney, Agent, or Firm* — Wenderoth, Lind & Ponack, L.L.P.

(57) ABSTRACT

The invention provides a sealer to be used for a bolt including a sprayed preservative coating coated onto at least a threaded portion. The sealer contains a wax therein in the range of 1 to 10 mass % both inclusive.

2 Claims, 5 Drawing Sheets

SEALER, FASTENER, BOLT AND METHOD OF FABRICATING BOLT

BACKGROUND OF THE INVENTION

1. Field of the Invention

The invention relates to a sealer used for a bolt coated with a sprayed preservative coating, a fastener to be fastened to an object including a sprayed preservative coating composed of aluminum, zinc-aluminum alloy or aluminum-magnesium alloy, based upon a sprayed coating composed of zinc, aluminum or alloys thereof and coated for the purpose of anti-corrosion of steal defined at JIS H 8300: 2005 "Spraying zinc, aluminum or alloys thereof" in Japanese Industrial Standard (JIS), for instance, a bolt, and a method of fabricating a bolt.

2. Description of the Related Art

As countermeasures to corrosion of a structure composed of steal, such as a steal column of a highway bridge, a high corrosion-resistant alloy is sprayed onto surfaces of such a steal structure in a factory to thereby form a high corrosion-resistant coating thereon. Such a steal structure is necessary to be assembled in a construction site for its structural reasons, and hence, is often assembled in a construction site by means of high tensile bolts (HTB) and nuts through the use of spliced plates. However, since high tensile bolts and nuts are not designed to be coated with a high corrosion-resistant coating unlike a steal structure, high tensile bolts and nuts are shorter in durable years than a steal structure, and hence, a maintenance has to be carried out in accordance with durable years of high tensile bolts and nuts.

Thus, high tensile bolts and nuts are desired to be coated with a high corrosion-resistance coating like surfaces of a steal structure. For instance, Japanese Patent Application Publication No. H3 (1991)-41207 suggested a bolt, at least a threaded portion of which is coated with a sprayed layer composed of molybdenum, chromium, tungsten or alloys thereof and having a thickness in the range of 10 to 150 micrometers. Japanese Patent Application Publication No. 2004-176901 suggested a bolt including a threaded portion onto which rigid particles each having a particle diameter of 10 micrometers or smaller are attached by high-speed flame spraying.

In order to use high tensile bolts and nuts in the same durable years as that of a steal structure coated with a high corrosion-resistant coating, it is considered that a high corrosion-resistant coating is necessary to be formed entirely on high tensile bolts and nuts as well as a threaded portion of a high tensile bolt like the bolts suggested in the above-mentioned Publications. However, fastening high tensile bolts and nuts, both of which are entirely coated with a high corrosion-resistant coating by spraying, to a steal structure, it was found that a desired axial force was not gained, even if high tensile bolts and nuts were fastened with a predetermined screw torque.

SUMMARY OF THE INVENTION

In view of the above-mentioned problems in the prior art, it is an object of the present invention to be able to gain a desired axial force when a bolt coated with a sprayed preservative coating is fastened with a predetermined screw torque.

In one aspect of the present invention, there is provided a sealer to be used for a bolt including a sprayed preservative coating coated onto at least a threaded portion, the sealer containing a wax therein in the range of 1 to 10 mass % both inclusive.

Sealing a bolt including a sprayed preservative coating coated onto at least a threaded portion thereof, through the use of the sealer in accordance with the present invention, a wax as well as the sealer is fixed onto a threaded portion of the bolt. Since the wax fixed on the threaded portion reduces a frictional force generated between the bolt itself and a nut, it is now possible to gain a desired axial force when the bolt is fastened with a predetermined screw torque.

If the sealer contains a wax therein below 1 mass %, the sufficient reduction in a frictional force between a bolt and a nut cannot be gained, and hence, it is not possible to gain a desired axial force when the bolt is fastened with a predetermined screw torque. When a structure including bolts is to be painted for the purpose of enhancing outlooking, it is preferable for the sealer to contain a wax in the range of 1 to 5 mass % both inclusive. If the sealer contains a wax over 5 mass % in painting a bolt, the adhesion between the sealer and a paint would be deteriorated. Even if a bolt is not to be painted, it is preferable for the sealer to contain a wax at 10 mass % or smaller. If the sealer contains a wax over 10 mass %, the sealer is fixed to a threaded portion of a bolt with a weak strength because the sealer contains a wax too much, resulting in that the wax is peeled off when the bolt is fastened.

It is preferable that the sealer contains a resin as a primary component. A resin to be contained in the sealer may be selected among epoxy resin, phenol resin, silicone resin, vinyl resin, polyester resin, polyurethane resin, epoxyphenol resin, polyamid resin and epoxymelamine resin, for instance.

It is particularly preferable that the wax is composed of paraffin.

Having studied fastening an object having a spraying preservative coating by means of a bolt and a nut both of which are coated with a spraying preservative coating, the inventors discovered that when a bolt and a nut are fastened to an object such that their spraying preservative coatings are caused to make contact with each other, the soft spraying preservative coatings are made integrated with each other because the spraying preservative coatings are baked, and hence, it is no longer possible to further fasten the bolt. The present invention is based on the discovery.

In another aspect of the present invention, there is provided a fastener to be fastened to an object including a sprayed preservative coating, the fastener including a bolt entirely coated with a sprayed preservative coating, at least a threaded portion of the blot being sealed with a sealer containing a wax therein in the range of 1 to 10 mass % both inclusive, and a nut to be fastened to the threaded portion of the bolt with the object being sandwiched between a head portion of the bolt and the nut, the nut coated with a sprayed preservative coating at portions except an inner threaded portion and a surface at which the nut makes contact with the object.

In a conventional fastener entirely coated with a sprayed preservative coating, when a bolt and a nut are fastened to an object such that spraying preservative coatings of the bolt and the nut and a spraying preservative coating of the object are caused to make contact with each other, the soft spraying preservative coatings are made integrated with each other because the spraying preservative coatings are baked, and hence, it is no longer possible to further fasten the bolt. In contrast, in the fastener in accordance with the present invention, since a sprayed preservative coating is not formed in the nut on an inner threaded portion and a surface at which the nut makes contact with an object, a sprayed preservative coating is formed on only one of surfaces of the nut and an object at which they make contact with each other, and only one of a female threaded portion of the nut and a male threaded portion of the bolt. Hence, sprayed preservative coatings formed on surfaces of the nut and an object or the nut and the bolt at which they make contact with each other are not baked, and accordingly, not integrated with each other when the bolt is fastened to the nut. Since a wax together with the sealer is fixed onto a male threaded portion of the bolt, a frictional force between the bolt and the nut is reduced, and hence, it is possible to fasten the bolt to the last with a predetermined screw torque.

After the fastener in accordance with the present invention was fastened, a sprayed preservative coating formed on a male threaded portion of the bolt is adhered to a female threaded portion of the nut at which a sprayed preservative coating is not formed, and further, a sprayed preservative coating formed on a surface of an object is adhered to a surface of the nut at which a sprayed preservative coating is not formed. As a result, the nut is entirely protected with a sprayed preservative coating.

It is preferable that the sprayed preservative coating is coated onto the nut by arc-spraying, and the sprayed preservative coating is coated onto the bolt by gas-spraying or plasma-spraying.

A sprayed preservative coating formed by arc-spraying has a higher surface roughness and a higher adhesive force than those of a sprayed preservative coating formed by gas-spraying or plasma-spraying. Hence, it is possible to prevent a sprayed preservative coating from being peeled off by applying the sprayed preservative coating formed by arc-spraying to a nut to be rotated by an impact wrench. In contrast, since a sprayed preservative coating formed by gas-spraying or plasma-spraying has a smaller surface roughness than that of a sprayed preservative coating formed by arc-spraying, the sprayed preservative coating coated onto a male threaded portion of a bolt would have a smooth surface, resulting in that the bolt can be readily fastened to a nut.

In still another aspect of the present invention, there is provided a bolt including a sprayed preservative coating coated onto at least a threaded portion, the bolt being sealed with a sealer containing a wax therein in the range of 1 to 10 mass % both inclusive.

In yet another aspect of the present invention, there is provided a method of fabricating a bolt, including coating a sprayed preservative coating onto at least a threaded portion, and sealing the bolt with a sealer containing a wax therein in the range of 1 to 10 mass % both inclusive.

The advantages obtained by the aforementioned present invention will be described hereinbelow.

Firstly, by sealing a bolt in which a sprayed preservative coating is formed at least onto a male threaded portion, with the sealer containing a wax in the range of 1 to 10 mass % both inclusive, the wax together with the sprayed preservative coating is fixed onto a male threaded portion of a bolt, resulting in that the wax having been fixed onto a male threaded portion reduces a frictional force between the bolt and a nut, and hence, it is possible to gain a desired axial force when the bolt is fastened with a predetermined screw torque.

Secondly, the fastener including a nut to be fastened to a male threaded portion of a bolt with an object being sandwiched between the nut and the bolt, the nut being coated with a sprayed preservative coating at portions except an inner threaded portion and a surface at which the nut makes contact the said object, at least a threaded portion of the nut being sealed with a sealer containing a wax therein in the range of 1 to 10 mass % both inclusive, prevents the sprayed preservative coatings of both the nut and the object from being integrated with each other when the nut is fastened to the object. In addition, since a wax together with a sprayed preservative coating is fixed onto a threaded portion of a bolt included in the fastener, it is possible to reduce a frictional force to be generated between the nut and the bolt, and further possible to fasten the bolt to the last with a predetermined screw torque. Thus, there can be obtained a desired axial force when the bolt is fastened with a predetermined screw torque.

Thirdly, by coating a sprayed preservative coating onto a nut by arc-spraying, and further, by coating a sprayed preservative coating onto a bolt by gas-spraying or plasma-spraying, it is possible to prevent a sprayed preservative coating from being peeled off when the nut is rotated by means of an impact wrench, for instance, and further, a sprayed preservative coating coated onto a threaded portion of the bolt can have a smooth surface with the result that a nut can be readily fastened to a threaded portion of the bolt.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1:
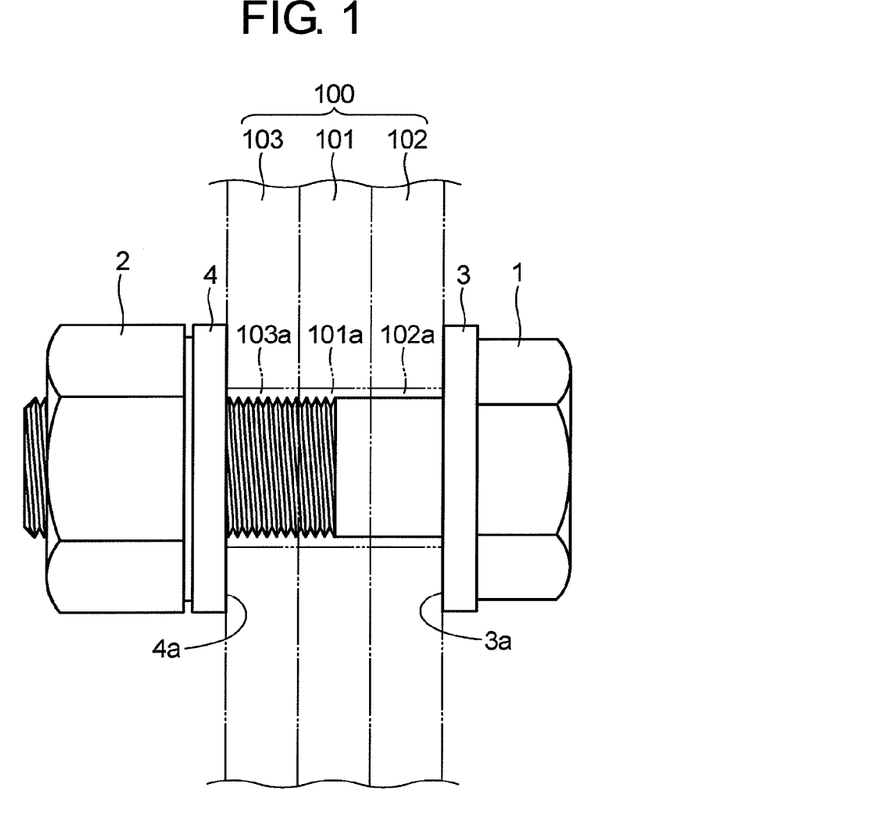
FIG. 1 is a side view of the fastener in accordance with the preferred embodiment of the present invention.
Figure 2:
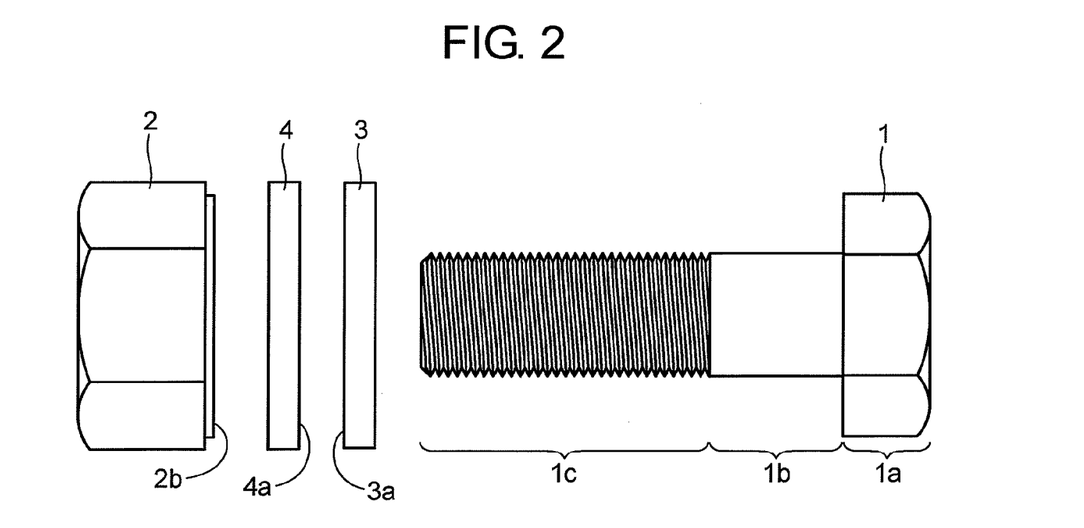
FIG. 2 is an exploded side view of the fastener illustrated in FIG. 1.
Figure 3:
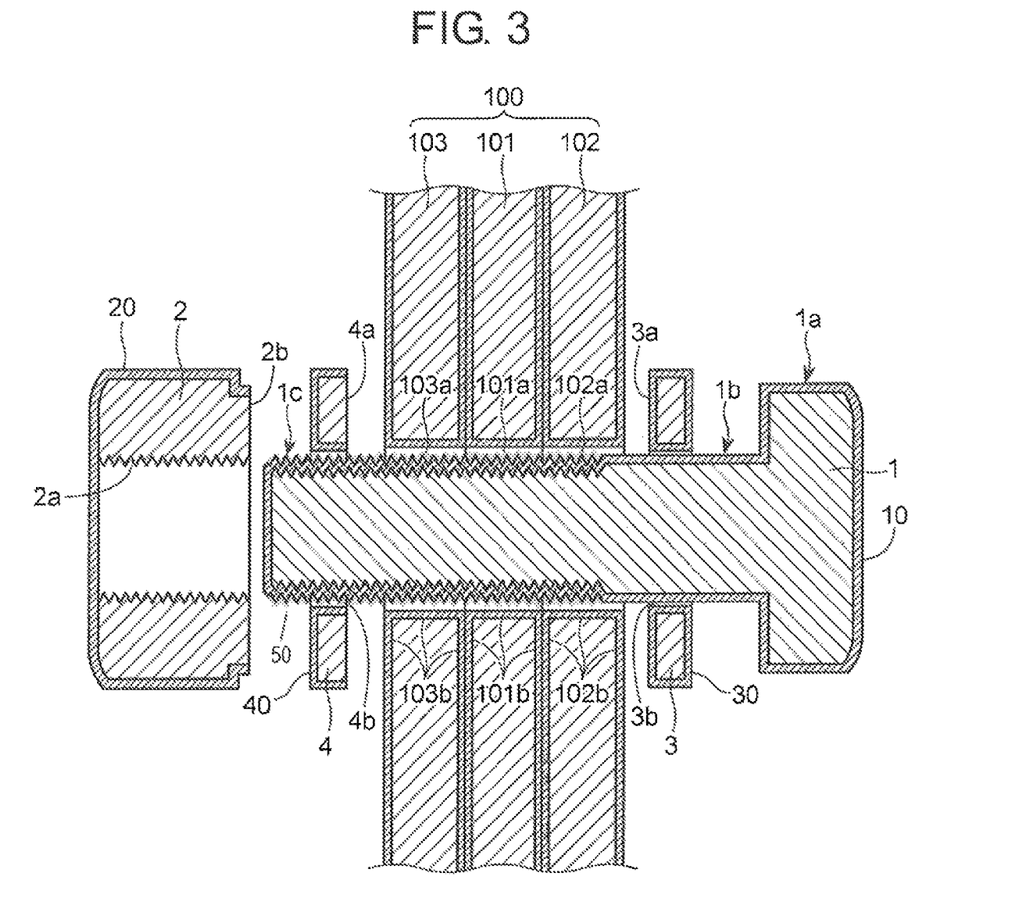
FIG. 3 is a cross-sectional view of the fastener illustrated in FIG. 1, showing where the sprayed preservative coatings are formed.
Figure 4:
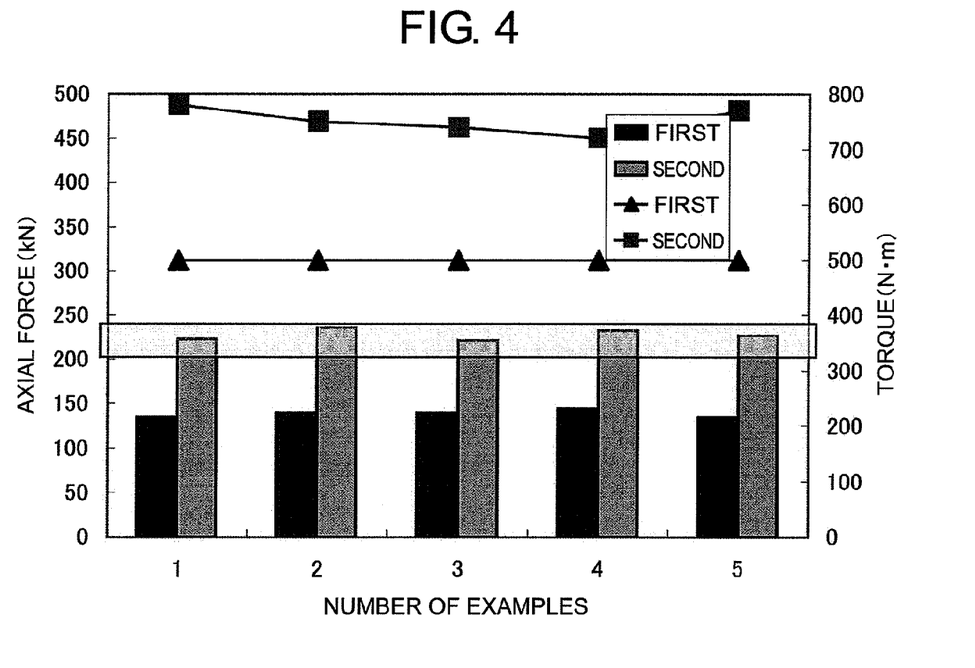
FIG. 4 is a graph showing a relation between a screw torque and a resultant axial force in a bolt sealed with acrylic silicone resin containing paraffin at 1.0 mass %.
Figure 5:
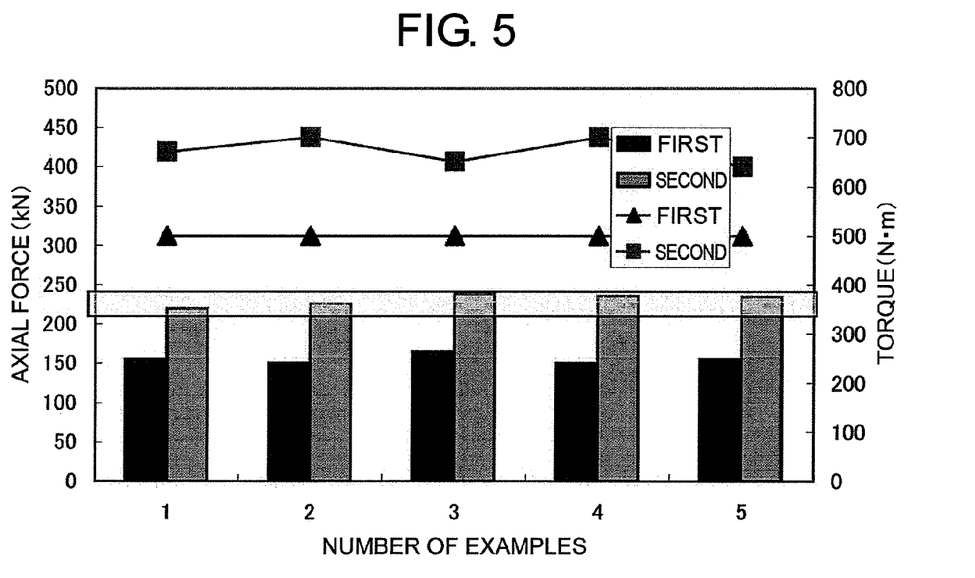
FIG. 5 is a graph showing a relation between a screw torque and a resultant axial force in a bolt sealed with acrylic silicone resin containing paraffin at 2.0 mass %.
Figure 6:
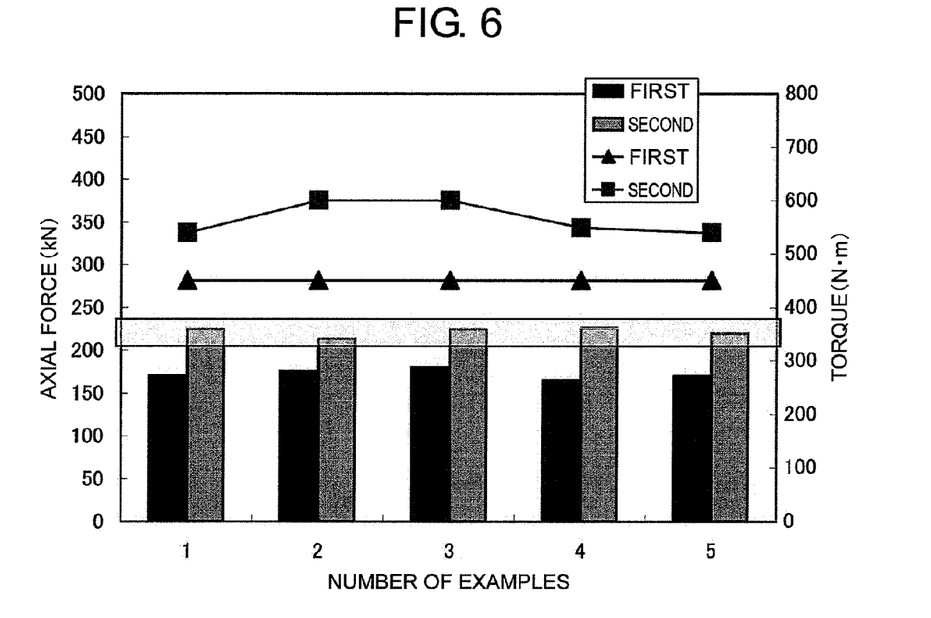
FIG. 6 is a graph showing a relation between a screw torque and a resultant axial force in a bolt sealed with acrylic silicone resin containing paraffin at 3.0 mass %.
Figure 7:
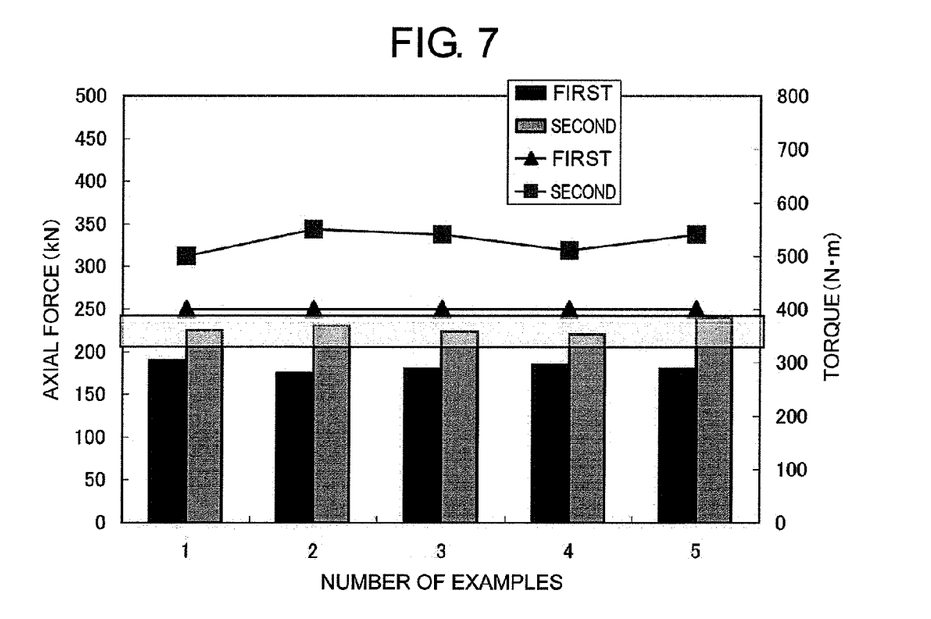
FIG. 7 is a graph showing a relation between a screw torque and a resultant axial force in a bolt sealed with acrylic silicone resin containing paraffin at 5.0 mass %.

FIG. 1 is a side view of the fastener in accordance with a preferred embodiment of the present invention, FIG. 2 is an exploded side view of the fastener illustrated in FIG. 1, and FIG. 3 is a cross-sectional view of the fastener illustrated in FIG. 1, showing where the sprayed preservative coatings are formed.

As illustrated in FIGS. 1 and 2, the fastener in accordance with the preferred embodiment is used for sandwiching a steal plate 101 as an object 100 between spliced plates 102 and 103, and includes a bolt 1, a nut 2 both used for fastening the steal plate 101 and the spliced plates 102 and 103 together, and washes 3 and 4.

As illustrated in FIG. 3, sprayed preservative coatings 101b, 102b and 103b each composed of Al—Mg alloy are formed entirely on surfaces of the steal plate 101 and the spliced plates 102 and 103, and further, on inner surfaces of holes formed through the steal plate 101 and the spliced plates 102 and 103 for inserting the bolt 1 therethrough.

The bolt 1 is comprised of a hexagon head bolt to be inserted into the holes 101a, 102a and 103a formed through the steal plate 101 and the spliced plates 102 and 103. As illustrated in FIG. 3, the bolt 1 is entirely coated with a sprayed preservative coating 10 composed of Al—Mg alloy. Specifically, a head 1a, a shaft 1b, and a threaded portion 1c of the bolt 1 are coated with the sprayed preservative coating 10. The sprayed preservative coating 10 is coated onto the bolt 1 by gas-spraying or plasma-spraying.

After coating the sprayed preservative coating 10 onto the bolt 1, the bolt 1 is sealed with a sealer 50 containing a wax at 1 to 10 mass % both inclusive, and further containing a resin as a primary constituent. A mass percent at which a wax is contained in the sealer is determined among 1 to 10 in accordance with a resin. In the current embodiment, the sealer 50 is designed to contain paraffin as a wax. As a wax, there may be selected a paraffin wax and a micro crystalyn wax both derived from petroleum, a montan wax and ozokerite both derived from mineral, a Fischer-Tropsch wax and a polyethylene wax both as a synthesized wax, a synthesized wax derived from grease, or a hydride wax, as well as waxes derived from animal and plant.

When a structure including bolts is to be painted for the purpose of enhancing outlooking, there is used the sealer 50 containing a wax in the range of 1 to 5 mass % both inclusive. For instance, the sealer 50 containing an acrylic silicone resin and further containing paraffin at 1 to 5 mass % both inclusive is coated onto the structure, and after the sealer is dried, polyurethane resin paint is painted onto the structure. Paraffin is added to the sealer as follows, for instance. After a resin sealer is diluted with thinner, paraffin is added to the sealer, and then, the sealer is slowly stirred for mixture with the sealer being heated by hot water.

In contrast, when a structure is not painted, a sealer containing silicone varnish and further containing paraffin at 8 to 10 mass % both inclusive is coated onto the structure. A resin to be contained in the sealer may be selected among epoxy resin, phenol resin, silicone resin, vinyl resin, polyester resin, polyurethane resin, epoxyphenol resin, polyamid resin and epoxymelamine resin, for instance.

The nut 2 comprises a hexagonal washer faced nut to be threaded to a threaded portion 1c of the bolt 1, sandwiching the steal plate 101 and the spliced plates 102 and 103 together with the bolt 1. The nut 2 has a face 2b having a diameter smaller than a width between two surfaces of a hexagonal head facing each other. As illustrated in FIG. 3, a sprayed preservative coating 20 composed of Al—Mg alloy is coated onto the nut 2 except an inner threaded portion 2a and the face 2b at which the nut 2 makes contact with the object 100. The sprayed preservative coating coated onto the nut 2 is formed by arc-spraying.

The washer 3 is sandwiched between the head la of the bolt 1 and the object 100, and the washer 4 is sandwiched between the nut 2 and the object 100. As illustrated in FIG. 3, a sprayed preservative coating 30 composed of Al—Mg alloy is coated entirely onto the washer 3. Specifically, the sprayed preservative coating 30 is coated onto a surface 3a at which the washer 3 makes contact with the object 100, and further, onto an inner surface of a hole 3b through which the bolt 1 is inserted. A sprayed preservative coating 40 composed of Al—Mg alloy is coated onto the washer 4, including an inner surface of a hole 4b through which the bolt 1 is inserted, but except a surface 4a at which the washer 4 makes contact with the object 100. The sprayed preservative coatings 30 and 40 are coated onto the washers 3 and 4 by arc-spraying.

In the fastener having the above-mentioned structure, since the sprayed preservative coating 20 is not formed in the nut 2 on the inner threaded portion 2a and the face 2b at which the nut 2 makes contact with the object 100, the sprayed preservative coatings 10 and 40 is formed on only one of the surfaces of the nut 2 and the washer 4 at which they make contact with each other, and further, on only one of the female threaded portion 2a of the nut 2 and the male threaded portion 1c of the bolt 1, when the nut 2 is fastened to the bolt 1. Hence, the sprayed preservative coatings 20 coated onto the nut 2, the sprayed preservative coatings 10 coated onto the bolt 1, and the sprayed preservative coatings 40 coated onto the washer 4 are not integrated with one another at surfaces at which the nut 2, the bolt 1 and the washer 4 make contact with one another, when the nut 2 is fastened to the bolt 1.

Furthermore, in the washer 4 to be sandwiched between the nut 2 and the object 100 in the fastener in accordance with the current embodiment, the sprayed preservative coating 40 is not coated onto a surface 4a at which the washer 4 makes contact with the object 100 when the nut 2 is fastened to the bolt 1. Specifically, only the sprayed preservative coating 103b is formed at surfaces of the washer 4 and the object 100 at which they make contact with each other. Thus, when the nut 2 is fastened to the bolt 1, the sprayed preservative coating 40 coated onto the washer 4 and the sprayed preservative coating 103b coated onto the spliced plate 103 are not integrated with each other at the surfaces of the washer 4 and the object 100 at which they make contact with each other.

That is, in the fastener in accordance with the current embodiment, the sprayed preservative coatings 20 coated onto the nut 2, the sprayed preservative coatings 10 coated onto the bolt 1, and the sprayed preservative coatings 40 coated onto the washer 4 are not integrated with one another at surfaces at which the nut 2, the bolt 1 and the washer 4 make contact with one another, when the nut 2 is fastened to the bolt 1, and further, the sprayed preservative coatings 40 coated onto the washer 4 and the sprayed preservative coatings 103b coated onto the spliced plate 103 are not integrated with each other. Accordingly, the bolt 1 can be fastened to the nut 2 with a predetermined screw torque to the last. Thus, the fastener in accordance with the current embodiment makes it possible to obtain a desired axial force when the bolt 1 is fastened to the nut 2 with a predetermined screw torque.

In the fastener in accordance with the current embodiment, the threaded portion 1c of the bolt 1 is sealed with the sealer containing paraffin at 1 to 10 mass % both inclusive, and thus, paraffin at 1 to 10 mass % together with a resin as a primary constituent in the sealer is fixed onto a surface of the sprayed preservative coating 10 coated onto the threaded portion 1c of the bolt 1. Accordingly, when the nut 2 is fastened to the threaded portion 1c of the bolt 1, a frictional force generated between the bolt 1 and the nut 2 is reduced, and thus, it is possible to obtain a desired axial force when the bolt 1 is fastened to the nut 2 with a predetermined screw torque.

In the fastener in accordance with the current embodiment, though the sprayed preservative coating 30 is coated onto a surface 3a of the washer 3 at which the washer 3 makes contact with the object 100, in the washer 3 sandwiched between the head 1a of the bolt 1 and the object 100, when the bolt 1 is fastened to the nut 2 with the object 100 being sandwiched therebetween, the nut 2 is rotated with the head 1a of the bolt 1 being kept stationary, and accordingly, the washer 3 is not rotated at the surface 3a relative to the object 100. This means that the sprayed preservative coating 30 coated onto the surface 3a of the washer 3 and the sprayed preservative coating 102a coated onto the spliced plate 102 are not baked, and hence, are not integrated with each other.

The sprayed preservative coating 30 may be coated entirely onto the washer 3 except the surface 3a, similarly to the washer 4.

After the bolt 1 was fastened to the nut 2 with the object 100 being sandwiched therebetween, exposed surfaces of the bolt, 1, the nut 2 and the object 100 are all protected with the sprayed preservative coatings 10, 20, 30, 40, 101b, 102b and 103b. Furthermore, since the sprayed preservative coating 40 coated onto the washer 4 and sprayed preservative coating 10 coated onto the threaded portion 1c of the bolt 1 are adhered and integrated to the inner threaded portion 2a and the face 2b of the nut 2 both of which are not coated with the sprayed preservative coating 20, respectively. Accordingly, the inner threaded portion 2a and the face 2b of the nut 2 are protected with the sprayed preservative coatings 10 and 40. Similarly, since the sprayed preservative coating 103b coated onto the spliced plate 103 is adhered and integrated to the surface 4a of the washer 4 which is not coated with the sprayed preservative coating 40 and at which the washer 4 makes contact with the object 100, the surface 4a of the washer 4 is protected with the sprayed preservative coating 103b.

In the fastener in accordance with the current embodiment, the sprayed preservative coating 20 is coated onto the nut 2 by arc-spraying which makes a coating having a high surface roughness and a high adhesive force, and the sprayed preservative coating 10 is coated onto the bolt 1 by gas-spraying or plasma-spraying which make a coating having a small surface roughness. Hence, even if the nut 2 is rotated by means of an impact wrench, it is possible to prevent the sprayed preservative coating 20 coated onto hexagonal faces of the nut 2 from being peeled off. Furthermore, since the sprayed preservative coating 10 coated onto the threaded portion 1c of the bolt 1 by gas-spraying or plasma-spraying has a smooth surface, the nut 2 can be readily rotated.

The fastener in accordance with the current embodiment is designed to include the bolt 1, the nut 2, and the washers 3 and 4. It should be noted that one or both of the washers 3 and 4 may be omitted, in which case, the sprayed preservative coating 10 or 20 exists at only one of the face 2b of the nut 2 and the surface of the spliced plate 103, and only one of the inner threaded portion 2a of the nut 2 and the threaded portion 1c of the bolt 1. Hence, when the nut 2 is fastened to the bolt 1, the sprayed preservative coating 20 coated onto the nut 2 and the sprayed preservative coating 10 coated onto the bolt 1 are not integrated with each other at surfaces at which the bolt 1 and the nut 2 make contact with each other. Thus, it is possible to fasten the bolt 1 to the nut 2 to the last with a predetermined screw torque, as mentioned earlier, and hence, it is possible to obtain a desired axial force when the bolt 1 is fastened to the nut 2 with a predetermined screw torque. The sprayed preservative coating 40 may be coated without any problems onto the surface 4a of the washer 4 at which the washer 4 makes contact with the object 100, because the nut 2 is not integrated with the washer 4, even if the washer 4 is integrated at the surface 4a with the sprayed preservative coating 103b.

The fastener in accordance with the current embodiment is designed to include the sprayed preservative coatings 10, 20, 30 and 40 each composed of Al—Mg alloy, similarly to the object 100. It should be noted that the sprayed preservative coatings 10, 20, 30 and 40 may be composed of zinc, aluminum or alloy thereof in dependence on a metal of which the sprayed preservative coating of the object 100 is composed.

EXAMPLE 1

Axial Force Test

The axial force test was carried out to the fastener in accordance with the above-mentioned embodiment.

In the test, there were prepared bolts having been sealed with sealers containing both a resin sealer and paraffin at varied mixture ratios. A screw torque and an axial force were measured to each of the bolts.

Figure 8:
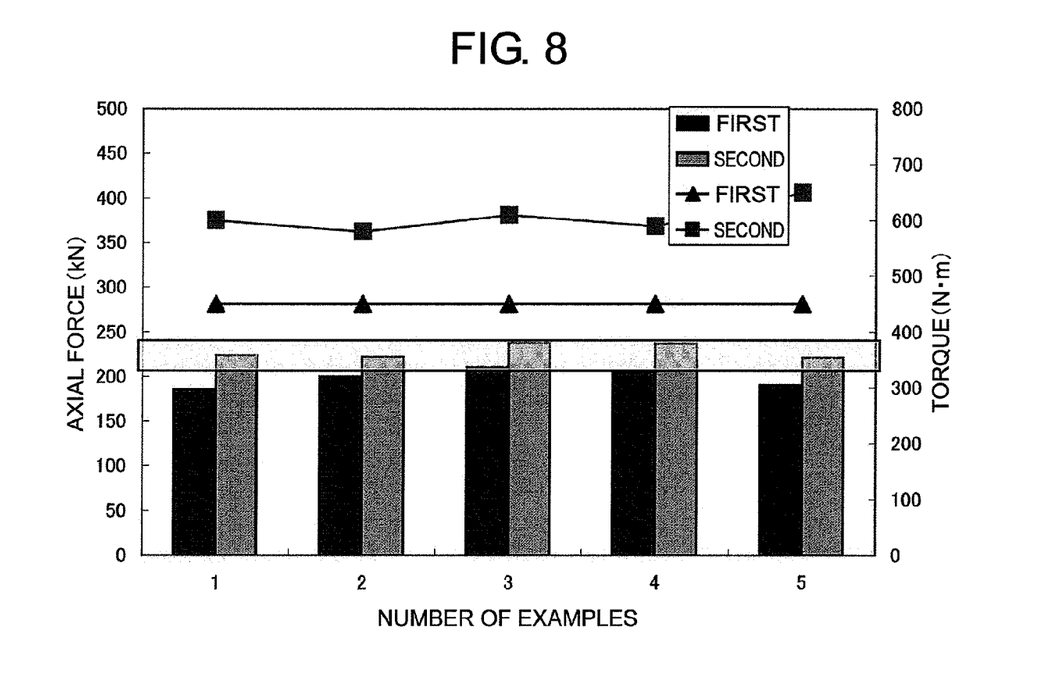
FIG. 8 is a graph showing a relation between a screw torque and a resultant axial force in a bolt sealed with silicone varnish containing paraffin at 10.0 mass %.

FIGS. 4 to 7 are graphs each showing a relation between a screw torque and a resultant axial force in each of the bolts sealed with acrylic silicone resin (commercially available from Nippon Paint Inc. in the tradename of "High-pon AZ Sealer") containing paraffin at 1.0, 2.0, 3.0, 4.0 and 5.0 mass %, respectively. FIG. 8 is a graph showing a relation between a screw torque and a resultant axial force in a bolt sealed with silicone varnish containing paraffin at 10.0 mass %.

As illustrated in FIGS. 4 to 8, when there were used the bolts sealed with a sealer containing paraffin, it was possible to obtain a target axial force by secondarily fastening the bolts with a predetermined torque.

Figure 9:
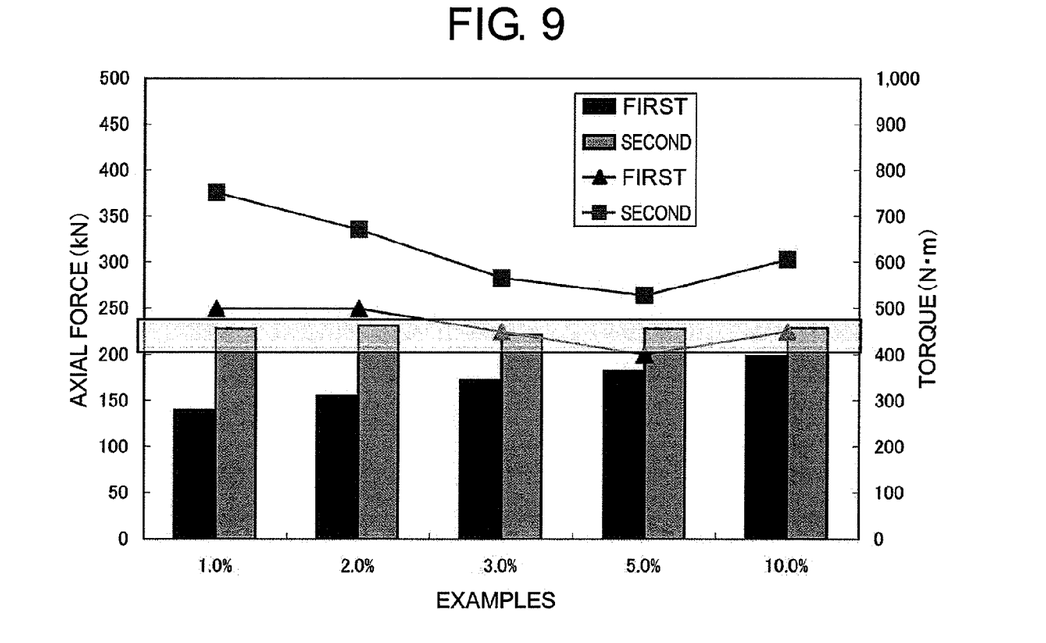
FIG. 9 is a graph showing a relation between a screw torque of a bolt and a resultant axial force in various paraffin mixture rates and sealers.

FIG. 9 is a graph showing a relation between a screw torque and an axial force in the bolts used in FIGS. 4 to 8. As is obvious in view of FIG. 9, it is possible to obtain a target axial force in fastening the bolts with a predetermined secondary screw torque, by varying a mixture ratio of paraffin in the sealer.

EXAMPLE 2

Adhesion Test Between Coating and Sealer

The test was carried out with respect to adhesion between a coating and the sealers containing a wax at various mixture ratios. The test was carried out in accordance with JIS K5600-5-6 (General test to paint Fifth Section: Mechanical characteristics of a coating, Sixth paragraph, Adhesion (Cross-cut test)).

Al—Mg alloy was sprayed onto the examples at a thickness of 100 micrometers. Then, acrylic silicone resin (commercially available from Nippon Paint Inc. in the tradename of "High-pon AZ Sealer") containing a wax at 1.0, 2.0, 5.0, 10.0 and 15.0 mass %, respectively, was coated onto the examples at 160 g/m$^2$. After the examples were dried, polyurethane resin paint (commercially available from Nippon Paint Inc. in the tradename of "High-pon AZ Sealer Finisher") was coated onto the examples at 140 g/m$^2$. After the examples were completely dried, the cross-cut test was carried out to the examples.

In the cross-cut test, horizontal six cut-outs and vertical six cut-outs were made in parallel by 1 mm space to each of the examples by means of a cutter. Then, a tear test was carried out to the examples through the use of an adhesive tape.

The results are as follows.

In the examples coated with the sealers containing a wax at 1.0, 2.0 and 5.0 mass %, any grids were not peeled off (Category 0). In the example coated with the sealer containing a wax at 10.0 mass %, one of grids was slightly peeled off at a corner (Category 1). In the example coated with the sealer containing a wax at 15.0 mass %, some grids were peeled off at corners (Category 2). Thus, it was confirmed that it was preferable for the sealer to contain a wax at 1.0 to 5.0 mass % both inclusive in the case that the examples were painted.

INDUSTRIAL APPLICABILITY

The fastener in accordance with the present invention is useful as a fastener used for fastening an object coated with a sprayed preservative coating.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2010-268557 filed on Dec. 1, 2010 including specification, claims, drawings and summary is incorporated herein by reference in its entirety.

What is claimed is:

1. A fastener to be fastened to an object including a sprayed preservative coating, said fastener comprising:
    a bolt entirely coated with a sprayed preservative coating, at least a threaded portion of said bolt being sealed with a sealer containing a wax therein in the range of 1 to 10 mass %, both inclusive; and
    a nut to be fastened to said threaded portion of said bolt with the object being sandwiched between a head portion of said bolt and said nut, said nut being coated with a sprayed preservative coating at portions except an inner threaded portion and a surface at which said nut is to make contact with the object.

2. The fastener as set forth in claim 1, wherein said sprayed preservative coating is coated onto said nut by arc-spraying, and said sprayed preservative coating is coated onto said bolt by gas-spraying or plasma-spraying.

\* \* \* \* \*